United States Patent

Eck

[15] 3,700,254
[45] Oct. 24, 1972

[54] TRAILER

[72] Inventor: Leonard F. Eck, 418 North Hartup, McPherson, Kans. 67460

[22] Filed: July 6, 1971

[21] Appl. No.: 160,003

[52] U.S. Cl. ..................... 280/63, 280/490, 301/127
[51] Int. Cl. ............................................. B62d 21/02
[58] Field of Search .......... 280/490, 63, 64, 65, 80 R; 301/124, 127

[56] References Cited

UNITED STATES PATENTS

| | | | |
|---|---|---|---|
| 2,218,881 | 10/1940 | Herlach | 280/80 R X |
| 3,580,608 | 5/1971 | Grant | 280/405 R |

*Primary Examiner*—Gerald M. Forlenza
*Assistant Examiner*—George F. Abraham
*Attorney*—Claude A. Fishburn et al.

[57] ABSTRACT

A trailer having an axle adapted to absorb shock includes a load supporting frame and a forwardly extending portion having an adjustable leveling hitch mounted thereon and having a movable portion selectively raised and lowered and connected to a towing vehicle to maintain the frame substantially level. The trailer includes a pair of wheels rotatably mounted on spindles at opposite ends of an axle formed of spring metal. Spaced connection members are mounted on the axle in upstanding relation with portions fixed to the frame and the connection members permit deflection of the axle relative to the frame as determined by the load on the trailer. The axle has a spindle at opposite ends and inclined downwardly to position the wheels closer together at the bottom than at the top when the frame is in an unloaded condition and substantially upright or slightly closer together at the top when the frame is in a loaded condition in response to deflection of the axle.

10 Claims, 8 Drawing Figures

PATENTED OCT 24 1972

INVENTOR.
Leonard F. Eck
BY
Fishburn Gold & Litman
ATTORNEYS

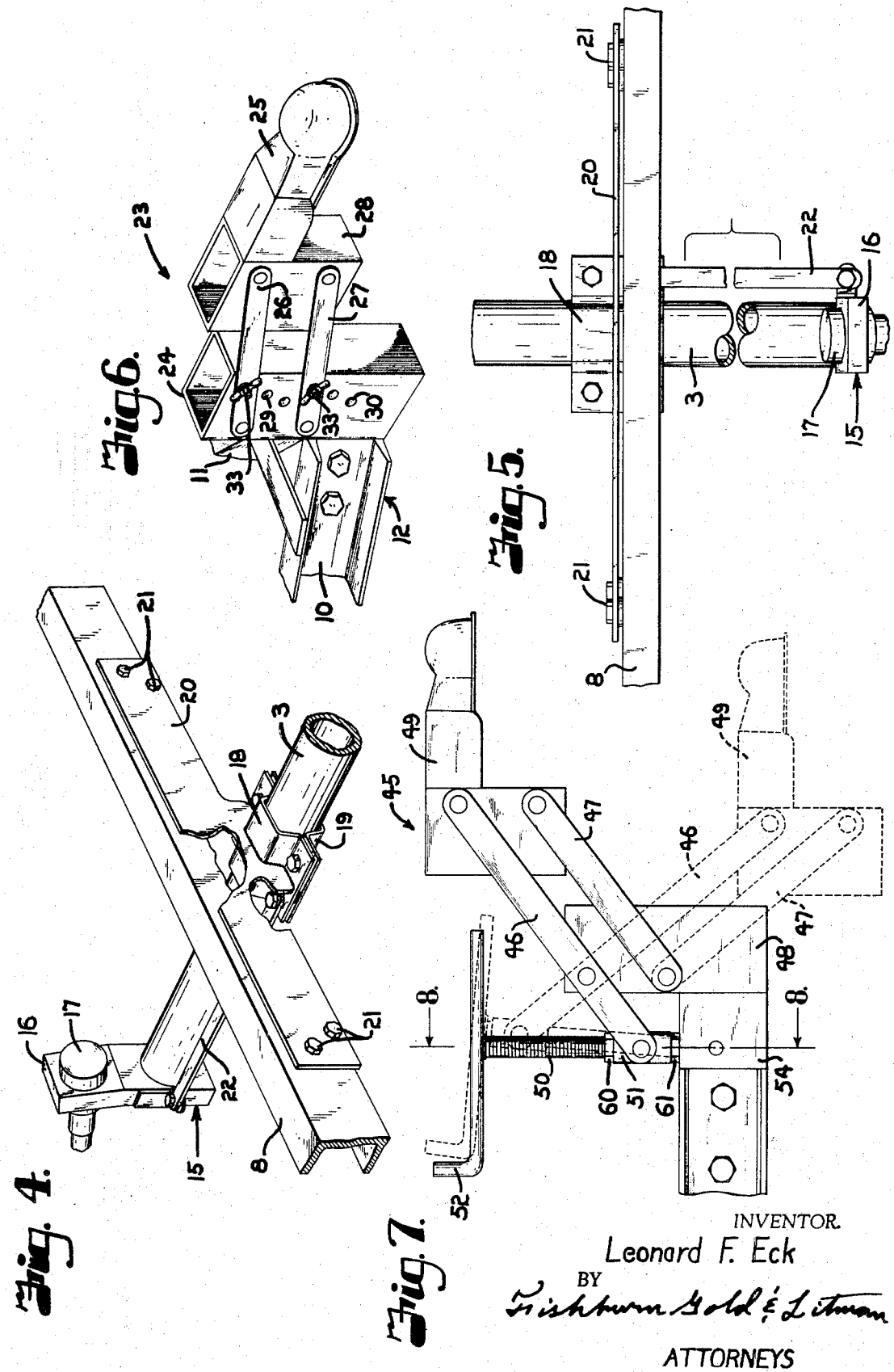

TRAILER

The present invention relates to trailers and more particularly to a trailer having a shock absorbing axle and an adjustable hitch each permitting the trailer to be maintained in a substantially level condition under load and when the hitch member is mounted on a towing vehicle.

Conventional two wheel trailers have a connection with a towing vehicle such that the trailer and the frame thereof are inclined differently between a loaded condition and an unloaded condition and are generally not level and conventional two wheel trailers having conventional springs extending between a substantially rigid axle and a rigid frame are particularly prone to oscillate and bounce when one of the wheels engages an obstruction or irregularity in a surface over which the trailer is traveling.

The principal objects of the present invention are: to provide a trailer particularly adapted for level operation when connected to towing vehicles having varied positions of connection means and which is stable in a loaded or unloaded condition; to provide such a trailer characterized by the elimination of oscillation points on an axle thereof as at conventional springs; to provide such a trailer having an axle of spring metal and wheels rotatably mounted on the axle so as to have the wheels closer together at the bottom than at the top when the trailer is in an unloaded condition and to have the wheels substantially upright or slightly closer together at the top when the trailer is in a loaded condition all in response to deflection of an axle relative to a frame of the trailer; to provide such a trailer having an adjustable leveling hitch with a portion thereof adapted to be raised and lowered to conform to the position of members for connecting same to a towing vehicle to thereby maintain a frame of the trailer level when connected to respective towing vehicles and to prevent toe-out of the wheels when a forward end of the trailer is raised and to prevent toe-in when a forward end of the trailer is lowered; to provide such a trailer which is stable in use and which remains substantially level in response to deflection of an axle relative to a frame of the trailer thereby absorbing a shock which is localized at either of a pair of wheels; to provide such a trailer characterized by a construction eliminating bounce, oscillation, sway, and the like, resulting from impact with an irregularity or obstruction; and to provide such a trailer which is economical to manufacture, durable in construction, positive in absorbing shock, and particularly well adapted for the proposed use.

Other objects and advantages of this invention will become apparent from the following description taken in connection with the accompanying drawings wherein are set forth by way of illustration and example certain embodiments of this invention.

FIG. 4 is an enlarged perspective view of the members connecting the axle and frame.

FIG. 5 is a plan view of the members connecting the axle and frame and showing connection to wheels of the trailer.

FIG. 6 is an enlarged perspective view of an adjustable leveling hitch for connection of the trailer to a towing vehicle to maintain the trailer substantially level.

FIG. 7 is an enlarged elevational view of a modified adjustable leveling hitch having a pivotally mounted threaded shaft for raising and lowering a hitch member to a position conforming with the position of members for connecting the hitch to a towing vehicle.

Figure 1:
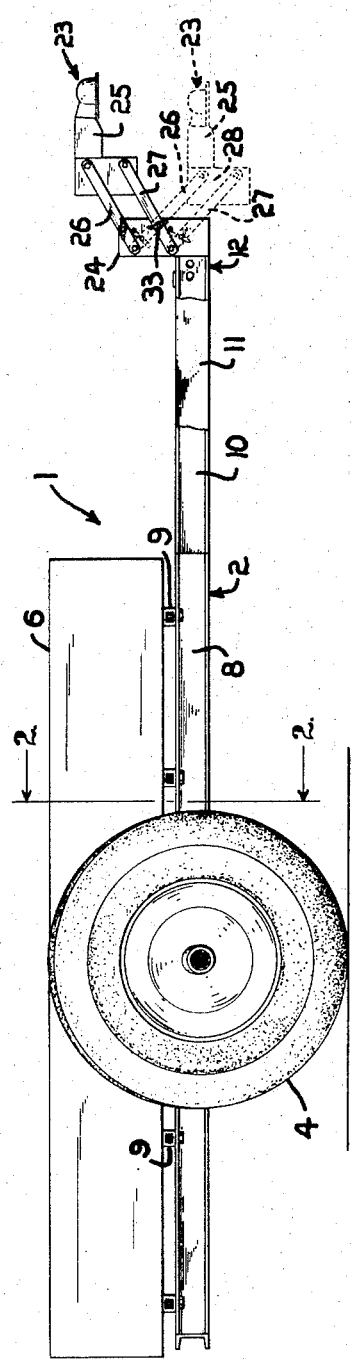
FIG. 1 is a side elevational view of a trailer embodying features of the present invention with an alternative position of the hitch shown in broken lines.
Figure 2:
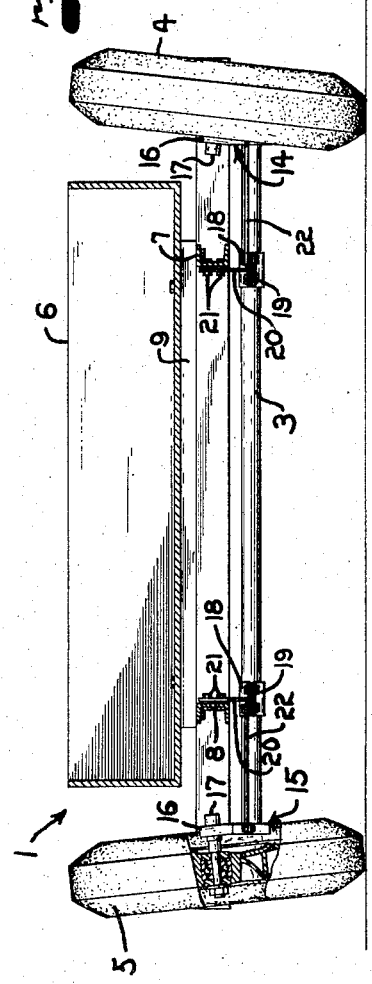
FIG. 2 is a transverse sectional view through the trailer taken on line 2—2, FIG. 1 showing the trailer in an unloaded condition.
Figure 3:
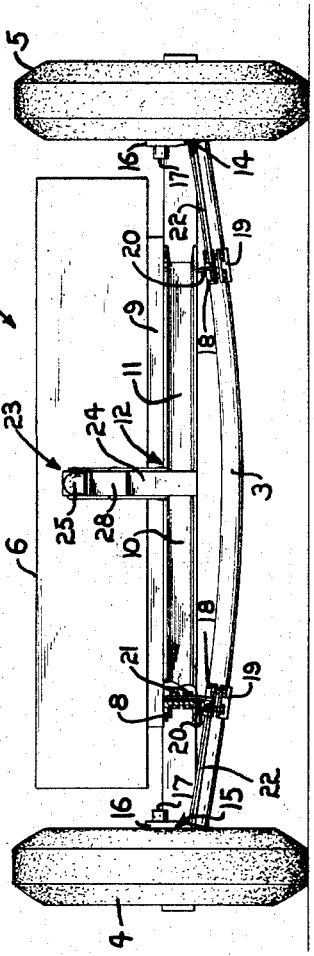
FIG. 3 is an end elevational view of the trailer showing the trailer in a loaded condition with the axle of the trailer deflected by the load.

Referring more in detail to the drawings:

The reference numeral 1 generally designates a trailer having an elongated frame 2 extending longitudinally of the trailer 1 and mounted on an axle 3 with wheels 4 and 5 rotatably mounted on opposite ends thereof. The axle 3 is formed of spring metal with the wheels and mounting arranged to position the wheels closer together at the bottom than at the top when the frame 2 is in an unloaded condition and substantially upright or slightly closer together at the top when the frame 2 is in a loaded condition in response to deflection of the axle 3, as later described.

The frame 2 may be any desired shape extending longitudinally of the trailer 1 to provide support for a suitable load carrying member 6 mounted thereon. In the illustrated structure, the frame 2 has a pair of transversely spaced longitudinal members 7 and 8 with the axle 3 extending transversely thereto and the frame 2 has a plurality of longitudinally spaced transverse members 9 connected to the longitudinal members 7 and 8 to form a substantially rigid structure. The frame 2 has forward end members 10 and 11 extending from the forward ends of the longitudinal members 7 and 8 respectively and forwardly converging toward and suitably secured together at a forward end 12 of the frame 2 to support a hitch member, as later described.

The axle 3 extends transversely of the frame 2 and is a shock absorbing member having a shape particularly effective in resisting torsional stresses while permitting a selected amount of bending or deflection under load toward and away from the frame 2. The illustrated axle 3 is formed of spring metal tubing particularly adapted to deflect an amount sufficient to move the wheels 4 and 5 from a cambered position to a substantially upright position or a position having the wheels 4 and 5 slightly closer together at the top when the frame 2 is loaded with a design load.

The axle 3 may have the wheels 4 and 5 rotatably mounted on suitable spindles inclined downwardly from opposite ends of the axle, however, it is desirable to lower the center of gravity of the trailer 1 to increase the stability of the trailer 1, therefore, the rotatable mounting of the wheels 4 and 5 on opposite ends of the axle 3 is illustrated as including substantially rigid standards 14 and 15 suitably secured adjacent opposite ends of the axle 3, as by welding, and upstanding therefrom. Each of the standards 14 and 15 includes an upright mounting portion secured to the axle 3 and a spindle support portion 16 extending upwardly and outwardly therefrom to form an angle with the plane of the mounting portion in the nature of 5° to 10°.

A spindle 17 is suitably supported in the spindle support portion 16 of each of the standards 14 and 15 and the spindles 17 each extend outwardly and normal to the spindle support portion 16 of the respective standards and are downwardly inclined at an angle of up to 10° below level whereby the wheels 4 and 5 mounted thereon are in a cambered position or closer together at the bottom than at the top when the frame 2 is in an unloaded condition. Placing a load on the frame 2 of the trailer 1 effects a deflection of the axle 3, as later described, to thereby move the wheels 4 and 5 to a substantially upright position or a position having the wheels slightly closer together at the top for transporting the load with a minimum of wear on suitable tires mounted on the wheels 4 and 5.

The frame 2 is preferably a substantially rigid structure and the axle 3 is preferably sufficiently flexible to deflect under load an amount sufficient to position the wheels 4 and 5 in a substantially upright position or a position having the wheels slightly closer together at the top. In the illustrated structure, upper and lower saddle members 18 and 19 are suitably secured to the axle 3, and are positioned adjacent each of the longitudinal members 7 and 8 of the frame 2. A frame connection member 20 is suitably secured to and extends upwardly from each of the upper saddle members 18 and the connection members 20 are each elongated planar members having opposite ends thereof suitably secured to the respective longitudinal frame members 7 and 8, as by a plurality of bolts 21.

The connection members 20 are planar or flat members each formed of spring metal and, in the illustrated structure, the connection members 20 each extend upwardly from the respective upper saddle member 18 and generally parallel with the longitudinal frame members 7 and 8 to resist bending parallel with the respective longitudinal member 7 and 8 of the frame 2 whereby each connecting member deflects laterally in response to movement of the axle 3 relative to the frame 2 thereby permitting the frame to remain substantially level.

The connection members 20 resist movement of the axle 3 longitudinally of the frame 2 or fore and aft thereof while permitting the lateral movement of the axle 3 under load and bending or flexing of the connection members 20 transversely of the frame 2 and transversely of the longitudinal dimension of the connection members 20.

It is desirable to maintain a substantially stable structure having a minimum of relative lateral movement between the frame 2 and the axle 3, therefore, bending or flexing of the connection members 20 transversely of the frame 2 and transversely of the connection members 20 is restricted or limited by a tie member 22 extending between the longitudinal frame members 7 and 8 and the standards 14 and 15 respectively and each having one end thereof connected to one of the respective upper and lower saddle members 18 and 19 and the other end of the tie members 22 connected to the standards 14 and 15 respectively.

An adjustable leveling hitch 23 is mounted on the forward end 12 of the frame 2 and has a movable portion mountable on a towing vehicle to thereby maintain the frame 2 substantially level regardless of the position of members for connecting same to the towing vehicle.

In the illustrated structure, the adjustable leveling hitch 23 includes a standard or post 24 secured to and extending upwardly from the forward end 12 of the frame 2 and a hitch or connection member 25 which is movably connected to the standard or post 24 for movement between a plurality of parallel positions each parallel with the frame 2 and arranged in an arc about a point on the standard or post 24 while maintaining the hitch or connection member 25 in a substantially level position adapted to be mounted on any towing vehicle (not shown) having a suitable member thereon to be received in or connected to the hitch or connection member 25.

In the illustrated structure, the standard or post 24 is secured to the forward ends of the forward end members 10 and 11 by suitable connectors, such as structural members in the form of bent plates, angles, or the like, each having one portion suitably secured to the standard or post 24 and an other portion suitable secured to the forward end of the respective forward end member 10 and 11, as by welding or a plurality of bolts, as shown in FIG. 6.

The movable connection between the standard or post 24 and the hitch or connection member 25 is illustrated as two pairs of parallel upper and lower arms 26 and 27 respectively with one pair of arms on each side of the standard or post 24 and with the arms of each pair each having one end pivotally mounted on the standard or post 24 and the other end pivotally mounted on a depending portion 28 of the hitch or connection member 25. The pivotal mounting of the arms 26 and 27 on the standard or post 24 and on the depending portion 28 of the hitch or connection member 25 are positioned to maintain the arms 26 and 27 in a spaced apart substantially parallel relation during movement of the hitch member 25.

When the hitch or connection member 25 is in a selected position, it is necessary to hold at least one of the arms 26 and 27 of each pair in a fixed position to prevent movement of the hitch or connection member 25 relative to the frame 2 and towing vehicle, therefore, means are provided which are engageable with the standard or post 24 and at least one of the arms 26 and 27 of each pair for holding the hitch or connection member 25 in a selected one of a plurality of positions whereby the frame 2 may be maintained in a level condition when the hitch or connection member 25 is mounted on a towing vehicle.

In the illustrated structure, the standard or post 24 has a plurality of spaced apertures therein arranged in groups 29 and 30 with the apertures therein in an arcuate path radially spaced from the pivotal mounting of the arms 26 and 27 of each pair respectively. The arms 26 and 27 each have apertures therein selectively alignable with the apertures in the groups 29 and 30 of apertures respectively in opposite sides of the standard or post 24. A suitable fastening member, such as a pin or bolt 33, is mounted in the apertures in the arms 26 and 27 and in a selected one of the apertures of the groups 29 and 30 in the opposite sides of the post 24 for holding the arms 26 and 27 in the selected position with the hitch or connection member 25 in position to be mounted on the towing vehicle.

In using a trailer constructed as illustrated and described, the adjustable leveling hitch 23 is mounted on the towing vehicle with the fastening members 33 mounted in the apertures in the post 24 and arms 26 and 27 of each pair so as to have the frame 2 in a level position when the trailer is loaded. Depending on the location of the center of gravity of the trailer and load to be supported thereon, the hitch or leveling member 25 may be positioned to have the forward or front end of the trailer frame slightly above or below the remaining portion of the frame so that the frame will be level when the load is placed on the trailer.

Figure 8:
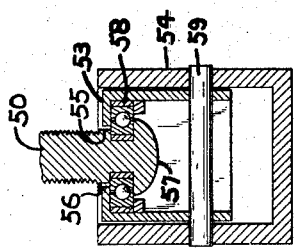
FIG. 8 is an enlarged fragmentary sectional view taken on line 8—8, FIG. 7 and showing the mounting of the threaded shaft on the trailer frame.

FIGS. 7 and 8 illustrate a modified adjustable leveling hitch 45 adapted to selectively pivot one arm of each of two pairs of parallel arms 46 and 47 pivotally mounted on opposite sides of a standard or post 48 to raise and lower a hitch or connection member 49 and hold same in a selected position whereby the frame of the trailer may be maintained in a level condition when the hitch or connection member 49 is mounted on a towing vehicle (not shown).

In the structure illustrated in FIGS. 7 and 8, an elongated threaded shaft 50 has one end pivotally mounted adjacent a forward end of the frame, as later described, and adjacent the standard or post 48. The threaded shaft 50 extends upwardly from the frame and has a sleeve member 51 threadedly engaged thereon for movement along the threaded shaft 50 in response to rotation thereof, as by a handle 52. The sleeve member 51 has one end of one arm of each of the two pairs of arms, for example arm 46, pivotally mounted thereon whereby movement of the sleeve member 51 along the threaded shaft 50 is effective to raise and lower the hitch or connection member 49.

FIG. 8 illustrates the pivotal mounting of one end of the threaded shaft 50 on the frame which includes a shaft support member 53 positioned between facing surfaces of spaced structural members forming a tongue portion 54 of the trailer frame. The shaft support member 53 has a bore 55 therein to receive a plain or unthreaded end portion 56 of the shaft 50 and an enlarged lower end 57 is formed on the shaft 50 and is engageable with one end of a thrust bearing 58 mounted within the shaft support member 53 for rotatably supporting the shaft 50 therein. The shaft support member 53 includes a pin 59 having ends extending outwardly from opposite sides thereof for pivotally mounting the shaft support member 53 and the threaded shaft 50 in the tongue portion 54 of the trailer frame.

The modified adjustable leveling hitch 45 provides means for a fine adjustment after the load is placed on the trailer to move the frame to a level position by rotation of the threaded shaft 50 to raise and lower the front or forward end of the trailer frame relative to the hitch or connection member 49 mounted on the towing vehicle. In the illustrated modified adjustable leveling hitch, the sleeve member 51 is maintained in the adjusted position by upper and lower nuts 60 and 61 respectively being moved along the shaft 50 and into engagement with upper and lower ends respectively of the sleeve member 51.

It is to be understood that while I have illustrated and described certain forms of my invention, it is not to be limited to these specific forms or arrangement of parts herein described and shown.

What I claim and desire to secure by Letters Patent is:

1. A trailer comprising:
   a. an elongated load supporting frame extending longitudinally of a trailer;
   b. means on said frame for connecting same to a towing vehicle;
   c. an elongated axle extending transversely of said frame, said axle being spring metal to permit lateral deflection of said axle;
   d. means on opposite end portions of said axle for rotatably mounting wheels; and
   e. flat members spaced along said axle and having one end portion of each secured to said axle with said flat members extending upwardly therefrom and connected to said frame, said flat members being spring metal and having a greater width thereof extending generally parallel with the longitudinal dimension of said frame whereby said flat members hold said axle against movement longitudinally of said frame while permitting said axle to bend toward and away from said frame, said flat members bending transversely of said frame.

2. A trailer comprising:
   a. an elongated load supporting frame extending longitudinally of a trailer;
   b. means on said frame for connecting the trailer to a towing vehicle;
   c. an elongated axle extending transversely of said frame, said axle being spring metal to permit lateral deflection of said axle;
   d. means on opposite end portions of said axle for rotatably mounting wheels; and
   e. means extending between said axle and said frame for holding said axle against movement longitudinally of said frame while permitting said axle to bend throughout the entire length thereof between said wheel mounting means whereby said axle is a shock absorbing member.

3. A trailer as set forth in claim 2 wherein said wheel mounting means includes a spindle mounted on each opposite end of said axle, said spindles each being downwardly inclined whereby the wheels are positioned closer together at the bottom than at the top when the frame is in an unloaded condition and substantially upright when the frame is in a loaded condition in response to lateral bending of said axle.

4. A trailer as set forth in claim 2 wherein said wheel mounting means includes:
   a. a substantially rigid standard secured to and extending upwardly from each end of said axle; and
   b. a downwardly inclined spindle secured to and extending outwardly from each of said standards whereby said wheels are closer together at the bottom than at the top when said frame is in an unloaded condition and substantially upright when said frame is in a loaded condition in response to lateral bending of said axle.

5. A trailer as set forth in claim 2 wherein said means connecting said frame to a towing vehicle is an adjustable hitch mounted adjacent a forward end of said frame and having a movable portion mountable on a towing vehicle and means to hold said movable portion in a selected one of a plurality of parallel positions to thereby maintain said frame and trailer substantially level.

6. A trailer as set forth in claim 5 wherein said adjustable hitch includes:
   a. a standard secured to and extending upwardly from the forward end of said frame;

b. a hitch member spaced from said standard;
c. a plurality of spaced parallel arms extending between and each having opposite ends pivotally mounted on said standard and said hitch member respectively for permitting said hitch member to move between a plurality of parallel positions; and
d. means engageable with said standard and at least one of said arms for holding said hitch member in a selected one of a plurality of parallel positions each parallel with said frame whereby said frame may be maintained in a level condition when said hitch member is mounted on a towing vehicle.

7. A trailer as set forth in claim 6 wherein said hitch member holding means includes:
    a. a plurality of spaced apertures in said standard, said apertures being arranged in an arcuate path spaced from the pivotal mounting of at least one of said arms;
    b. an aperture in said one arm selectively alignable with each of said apertures in said standard; and
    c. a fastening member mounted in said aperture in said one arm and a selected one of said apertures in said standard for holding said one arm in the selected position.

8. A trailer as set forth in claim 6 wherein said hitch member moving and holding means includes:
    a. an elongated threaded shaft having one end rotatably and pivotally mounted adjacent a forward end of said frame and adjacent said standard, said threaded shaft extending upwardly from said frame;
    b. a sleeve member threadedly engaged with said threaded shaft, said sleeve member having one end of one of said arms pivotally mounted thereon whereby movement of said sleeve member is effective to raise and lower said hitch member; and
    c. means on said threaded shaft for selectively rotating same to thereby move said sleeve member along said threaded shaft.

9. A trailer as set forth in claim 2 wherein said axle holding means includes:
    a. a saddle member secured to said axle for each longitudinal member of said frame; and
    b. a flat connection member for each saddle member and each flat connection member having one portion thereof secured to said respective saddle member and extending upwardly therefrom and connected to the respective longitudinal member of said frame, said flat connection members each being spring metal and having a greater width thereof extending generally parallel with the longitudinal dimension of said frame whereby said flat connection members hold said axle against movement longitudinally of said frame while permitting said axle to bend toward and away from said frame, said flat connection members bending transversely of said frame.

10. A trailer as set forth in claim 2 wherein:
    a. said wheel mounting means includes a spindle mounted on each opposite end of said axle, said spindles each being downwardly inclined to position the wheels closer together at the bottom than at the top when the frame is in an unloaded condition and substantially upright when the frame is in a loaded condition in response to lateral bending of said axle;
    b. said axle holding means includes a saddle member secured to said axle for each longitudinal member of said frame and a flat connection member for each saddle member and each flat connection member having one portion thereof secured to said respective saddle member and extending upwardly therefrom and connected to the respective longitudinal member of said frame, said flat connection members each being spring metal and having a greater width thereof extending generally parallel with the longitudinal dimension of said frame whereby said flat connection members hold said axle against movement longitudinally of said frame while permitting said axle to bend toward and away from said frame, said flat connection members bending transversely of said frame; and
    c. said means connecting said frame to a towing vehicle is an adjustable hitch mounted adjacent a forward end of said frame and having a movable portion mountable on a towing vehicle and means to hold said movable portion in a selected one of a plurality of parallel positions to thereby maintain said frame and trailer substantially level.

* * * * *